June 3, 1947.    W. S. DIEHL    2,421,374
ARTICULATED BALANCE FOR AIRCRAFT CONTROLS
Filed July 27, 1942    3 Sheets-Sheet 1
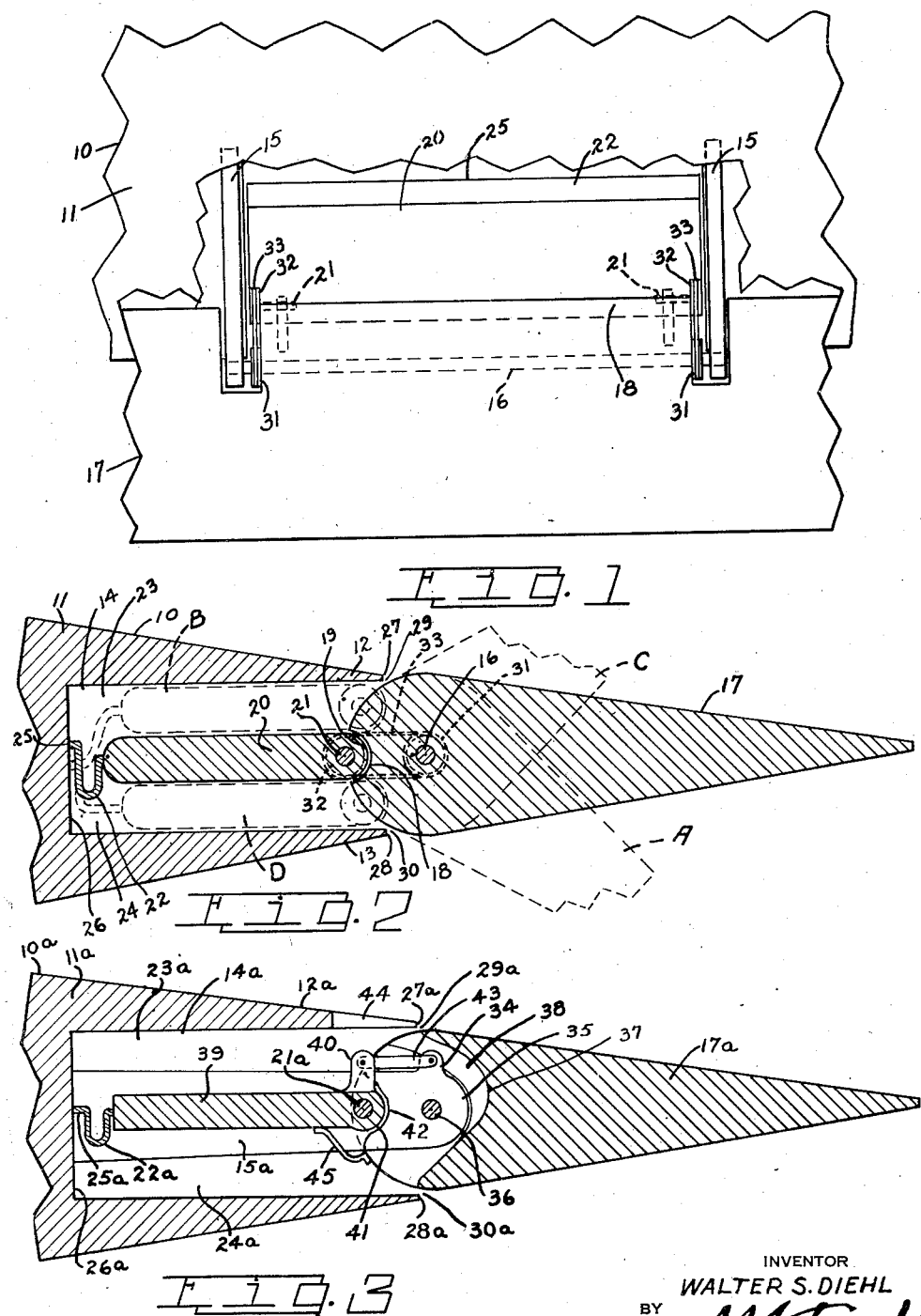
INVENTOR
WALTER S. DIEHL
BY
ATTORNEY

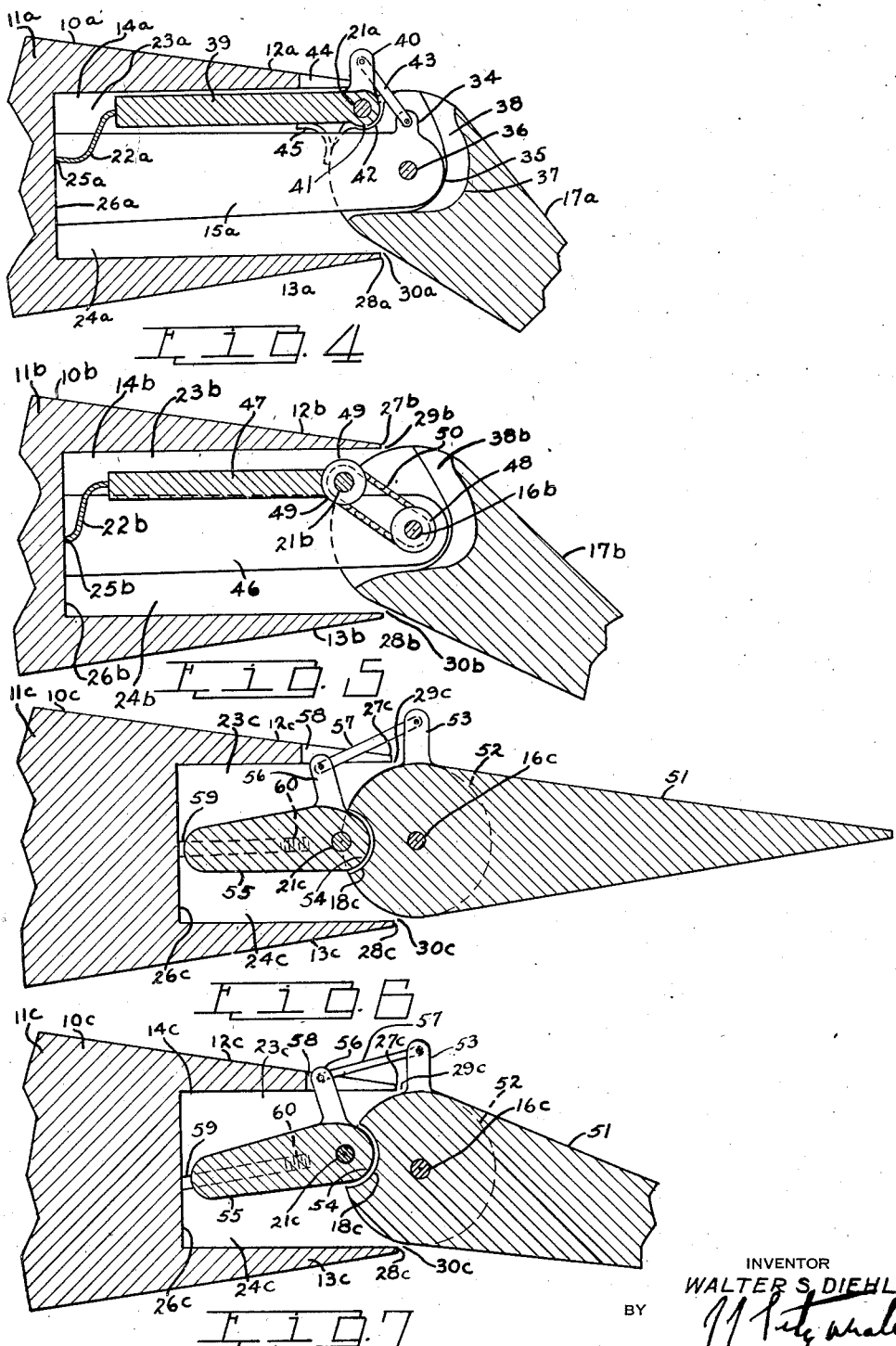

June 3, 1947.  W. S. DIEHL  2,421,374
ARTICULATED BALANCE FOR AIRCRAFT CONTROLS
Filed July 27, 1942  3 Sheets-Sheet 3
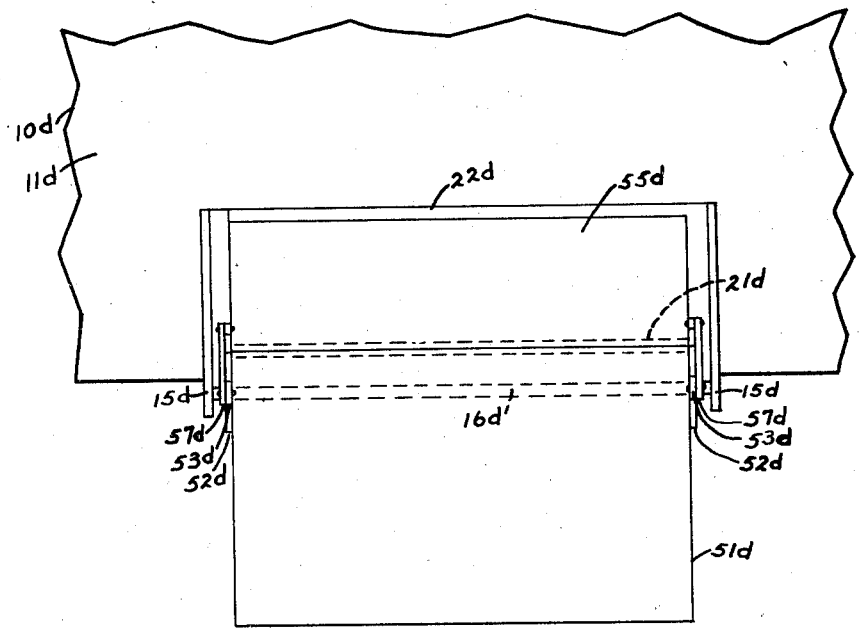
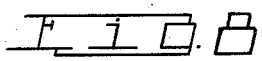
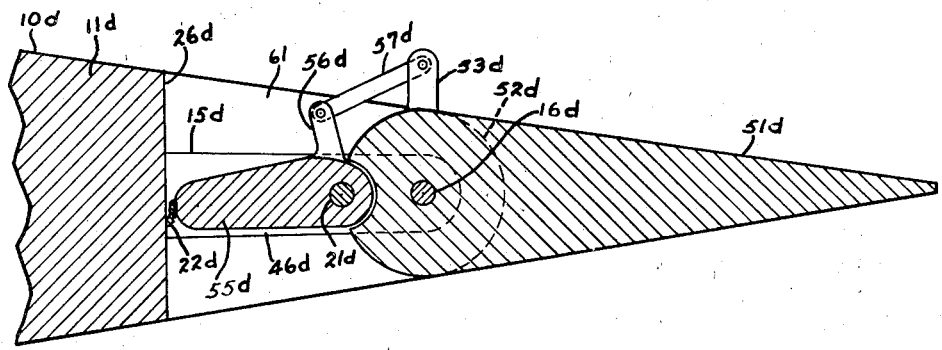
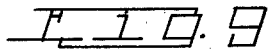
INVENTOR
WALTER S. DIEHL
BY
ATTORNEY Patented June 3, 1947

2,421,374

UNITED STATES PATENT OFFICE 2,421,374

ARTICULATED BALANCE FOR AIRCRAFT CONTROLS

Walter Stuart Diehl, United States Navy, Washington, D. C.

Application July 27, 1942, Serial No. 452,531

6 Claims. (Cl. 244—90)

(Granted under the act of March 3, 1883, as amended April 30, 1928; 370 O. G. 757)

The present invention relates to improvements in aerodynamic balance or control surfaces, particularly to balances shown in United States Patent 2,239,475 to Weick, and in the pending application of Thomas A. Harris Serial No. 427,464.

In aircraft it is necessary to provide aerodynamic balance for controlling and maneuvering the craft. In order to reduce the hinge moment of control surfaces, and consequently the effort on the part of a pilot to move them, it is common practice to balance the surfaces so that the pilot is relieved of undue exertion. In balancing the control surface, a portion of the surface is placed ahead of the hinge axis, thus providing a means for assisting in the movement of the surface, and utilizing the air pressures on the upper and lower surfaces of the wing or airfoil to balance the moment of a hinged trailing portion.

An object of the present invention is the provision of means for preventing the leading edge of a control balance from limiting or restricting the available throw.

Another object of the present invention is the provision of an aerodynamic balance that will reduce the hinge moments on aircraft control to a minimum.

A further object of the present invention is the provision of an articulated balance positioned ahead of the balanced member.

A still further object of the present invention is the provision of an articulated balance member that moves substantially parallel to its original position.

A still further object of the present invention is the provision of means for moving the articulated balance in a substantially parallel position.

A still further object of the present invention is the provision of an articulated member that moves substantially parallel to its original position, thus preventing the leading edge of a balance control from emerging beyond the boundary of the fixed surface to which it is attached.

Other objects of the present invention will become apparent during the course of the following detailed description, taken in connection with the accompanying drawings, forming a part of this specification, and in which drawings:

Figure 1 is a fragmentary top plan view of a wing and aileron, and illustrating the mounting of the aileron and articulated balance.

Figure 2 is a diagrammatic transverse vertical section through an aircraft wing and aileron, and illustrating the articulated balance and the means connecting the balance to the aileron, the aileron being shown in its normal, neutral control position, the dotted lines illustrating the position of the articulated balance with respect to the position of the aileron.

Figure 3 is a view similar to Figure 2 but showing a modified form of means connecting the articulated member to the aileron, the aileron being shown in its normal or neutral position, the wing being shown fragmentarily.

Figure 4 is a view similar to Figure 3 and illustrating the position the articulated balance assumes when the aileron assumes the position illustrated.

Figure 5 is a view similar to Figure 4 but illustrating a modified form of means connecting the articulated balance to the aileron.

Figure 6 is a diagrammatic, transverse, vertical section through an aircraft wing and aileron, and illustrating a modified form of articulated balance and the means connecting the balance to the aileron, and the seal carried by the balance, the aileron being shown in its normal or neutral position.

Figure 7 is a view similar to Figure 6 and illustrating the position the articulated balance assumes when the aileron assumes the position illustrated, the wing and aileron being shown fragmentarily.

Figure 8 is a fragmentary top plan view of a wing and aileron and illustrating an opening in the wing instead of a vented chamber.

Figure 9 is a diagrammatic transverse vertical sectional view of the construction shown in Figure 8.

Referring to the drawings, the numeral 10 represents an airfoil having a body portion 11 that has the opposite sides 12 and 13 defining a chamber 14.

Mounted in the body of the airfoil 11 are brackets 15 supporting a shaft 16 that carries an aileron 17 provided with an arcuate portion 18. At this point I wish to have it understood, that, although I have shown a shaft upon which the aileron is mounted, other means may be employed for mounting the aileron. The arcuate portion 18 receives a corresponding portion 19 of an articulated member 20 pivotally mounted in any suitable manner in the aileron, such as by bearing pins 21. The articulated member 20 is provided with a flexible member 22, the members 20 and 22 dividing the chamber 14 into compartments 23 and 24, the marginal edge 25 of the flexible member 22 engaging the wall 26 of the chamber 14. The ends 27 and 28 of the sides 12 and 13 are spaced from the aileron, providing vents or passages or slots 29 and 30. The bracket 15 and the articulated member 20 have grooved drums 31 and 32 rigidly secured to the respective members, and around the drums there is trained a belt 33.

In Figures 3 and 4, I have illustrated a modified form of my invention, in which the bracket 15a is provided with a horn 34 and a rounded nose portion 35. The brackets 15a at 36 support an aileron 17a, the aileron at 37 having an irregular grooved portion 38, providing free movement of the aileron around the nose portion 35. In the chamber 14a, there is an articulated member 39 provided with an arm 40, and an arcuate portion 41 that engages an arcuate portion 42 that may be a bearing in the leading edge of the aileron 17a. The arm 40 is connected to the horn 34 by a link 43, and there is provided in the side 12a, slot 44 for free movement of the arm 40. If desired, a fabric seal 45 may be provided between the articulated balance 39 and the portion or bearing 42.

In the form of modification illustrated in Figure 5, the construction is similar to Figure 2 and I have provided, in this modification, sprocket wheels 48 and 49 that are mounted on shafts or pin bearings 16b and 21b, the sprockets being rigidly fixed to the bracket and the articulated balance respectively. The sprockets 48 and 49 have trained around them a sprocket chain 50.

In the modification as illustrated in Figures 6 and 7, the aileron 51 is mounted on a shaft 16c, the aileron being provided with an arcuate portion 18c. Fixedly secured to the aileron shaft 16c is a member 52 having a finger 53. The arcuate portion 18c receives a corresponding portion 54 of an articulated member 55 that is pivotally mounted on bearing pins 21c. The member 55 has an arm 56 that is connected to the finger 53 by a link 57. It is to be noted that the side 12c of the body portion 11c of the airfoil 10c is provided with a slot 58. In the member 55, as illustrated in dotted lines 59, I have shown a plunger type of seal instead of the flexible type as shown in the other views. In this type of seal the plunger at one end engages a spring 60, the opposite end engaging the wall 26c.

The modification illustrated in Figures 8 and 9 differs from the structure illustrated in Figures 6 and 7 in that the wing 11d is provided with an opening 61 instead of a vented chamber, and the articulated member 55d is provided with a flexible flap 22d.

In the operation of the device, as illustrated in Figures 1 and 2, the drum 31, being fixedly secured to the bracket 15 and the drum 32 fixed to the articulated member 20, movement of the aileron 17 in the direction indicated by dotted lines "A" will impart motion to the articulated member 20 through the medium of the belt 33, the articulated member assuming the position as indicated by the letter "B." During the movement of the aileron and the articulated member, the articulated member will move in a parallel motion to its original position, the flexible member or seal 22 assuming the position as shown by the dotted line. Upward movement of the aileron as indicated by the letter C will move the articulated member to a position indicated by the letter D.

The operation of the modification as illustrated in Figures 3 and 4 is the same as illustrated in Figures 1 and 2 except that movement of the articulated member is effected by the arcuate portion 41 engaging bearing 42 and the link 43 connecting the articulated arm 40 to the horn 34 of the bracket 15a.

The operation of the modification illustrated in Figure 5 is the same as shown in Figure 2, the difference being the use of sprockets and chain drive instead of drums and a belt.

In the modification, as illustrated in Figures 6 and 7, the articulated member simulates a bell crank and it is provided with a plunger type of seal.

The operation of the modification as illustrated in Figures 8 and 9 is the same as illustrated in Figures 6 and 7.

Various changes may be made in the forms of invention herein shown and described without departing from the spirit of the invention or the scope of the following claims.

The invention described may be manufactured and/or used by or for the Government of the United States of America for governmental purposes without the payment of any royalties thereon or therefor.

What I claim is:

1. In a control surface for aircraft, a fixed surface and a movable control surface, a recess in the fixed surface, an articulated extension on the leading edge of said movable surface, means for vertically moving said articulated extension in said recess in a substantially horizontal position, a flexible flap carried by said articulated member, said flexible flap being secured to a wall in said recess and to the forward edge of said articulated extension and dividing said recess into upper and lower compartments, said compartments being vented to the atmosphere on their respective sides.

2. In a control surface for aircraft, a fixed surface and a movable control surface, a recess in the fixed surface, an articulated extension on the leading edge of said movable control surface, means for vertically moving said articulated extension in said recess in a substantially horizontal position, a flexible flap carried by said articulated member and so secured whereby said recess is divided into separate compartments which are thereby sealed from each other, said compartments being vented to the atmosphere on opposite sides of said dividing flap and articulated member.

3. In a control surface for aircraft, a fixed surface and a hinged control surface, a recess in said fixed surface forward of said hinged surface, vent means for said recess, an articulated extension on the leading edge of said hinged control surface, a flexible flap carried by said articulated member, said extension, control surface and flap dividing said recess into two sub recesses sealed from each other and means for vertically moving said articulated extension in said recess in a substantially horizontal position.

4. In a control surface for aircraft, a fixed surface and a hinged control surface, a recess in said fixed surface forward of said hinged surface, vents in said recess, an articulated extension on the leading edge of said hinged surface housed in said recess, a flexible flap carried by said articulated member, and means for vertically moving said articulated extension in said recess in a substantially horizontal position.

5. In a control surface for aircraft, a fixed surface and a hinged control surface, a recess in said fixed surface forward of said hinged surface, vents in said recess, an articulated extension on the leading edge of said hinged control surface housed in said recess, a seal in said recess, one end of said seal being in engagement with a wall of said recess, the opposite end of said seal being in engagement with the leading edge of said articulated member, and means for vertically moving said articulated extension in said recess in a substantially horizontal position, said seal and articulated member dividing said recess into two compartments sealed from each other, said vents in each said compartment admitting differential pressures into said compartments.

6. In a control surface for aircraft, a fixed surface and a hinged control surface, a recess in said fixed surface forward of said hinged control surface, vents in said recess, an articulated extension on the leading edge of said hinged control surface and housed in said recess, a seal in said recess, one end of said seal being in engagement with a wall of said recess, the opposite end of said seal being in engagement with the leading edge of said articulated member, means for vertically moving said articulated extension in said recess in a substantially horizontal position, said articulated member and seal dividing said recess into compartments sealed from each other, said vents in each said compartment admitting differential pressures into said compartments.

WALTER STUART DIEHL.

REFERENCES CITED

The following references are of record in the file of this patent:

UNITED STATES PATENTS

| Number | Name | Date |
|---|---|---|
| 2,222,187 | Weatherbee | Nov. 19, 1940 |
| 1,574,567 | Flettner | Feb. 23, 1926 |
| 2,211,870 | Wagner et al. | Aug. 20, 1940 |
| 2,239,475 | Weick | Apr. 22, 1941 |
| 2,252,284 | Child | Aug. 12, 1941 |
| 2,281,696 | Johnson | May 5, 1942 |
| 2,361,275 | Davie | Oct. 24, 1944 |

FOREIGN PATENTS

| Number | Country | Date |
|---|---|---|
| 441,603 | France | May 30, 1912 |
| 546,815 | France | Sept. 4, 1922 |
| 642,042 | Germany | Feb. 20, 1937 |
| 693,900 | Germany | July 20, 1940 |